United States Patent [19]

Letson

[11] Patent Number: 5,984,621

[45] Date of Patent: Nov. 16, 1999

[54] PALLET STACKING MACHINE

[75] Inventor: Michael L. Letson, Prior Lake, Minn.

[73] Assignee: Viking Engineering & Development Incorporated, Fridley, Minn.

[21] Appl. No.: 08/996,714

[22] Filed: Dec. 23, 1997

[51] Int. Cl.⁶ ..................................................... B65G 59/02
[52] U.S. Cl. ........................ 414/792.9; 414/928; 414/929; 901/16
[58] Field of Search ................................ 414/792.7, 792.8, 414/792.9, 927, 928, 929, 799; 901/16

[56] References Cited

U.S. PATENT DOCUMENTS

| | | | |
|---|---|---|---|
| 2,827,178 | 3/1958 | Pagdin | 414/792.9 |
| 3,478,897 | 11/1969 | Dykeman | 414/929 |
| 3,645,409 | 2/1972 | Sinclair . | |
| 3,998,169 | 12/1976 | Koch . | |
| 4,492,016 | 1/1985 | Smets et al. . | |
| 4,592,692 | 6/1986 | Suizu et al. | 414/792.8 |
| 4,743,154 | 5/1988 | James et al. . | |
| 4,988,263 | 1/1991 | Odenthal | 414/929 |
| 5,355,575 | 10/1994 | Self . | |
| 5,630,695 | 5/1997 | McDonnell | 414/928 |
| 5,765,989 | 6/1998 | Kraus et al. | 414/929 |

FOREIGN PATENT DOCUMENTS 135032 10/1980 Japan ................................ 414/792.8

*Primary Examiner*—Christopher P. Ellis
*Assistant Examiner*—Gregory A. Morse
*Attorney, Agent, or Firm*—Nikolai, Mersereau & Dietz, P.A.

[57] ABSTRACT

A machine for stacking articles such as wooden pallets comprises a frame for supporting a carriage assembly that can be raised and lowered under control of a motor and where the carriage assembly supports an article grasping machine that is slidably mounted on the carriage assembly allowing horizontal movement of the article grasping assembly relative to the carriage. When using the machine to stack wooden pallets, a pallet may be picked up at a first location and elevated and translated so as to overlay a top pallet on a stack of pallets before the one being carried is released.

14 Claims, 5 Drawing Sheets

PALLET STACKING MACHINE

BACKGROUND OF THE INVENTION

I. Field of the Invention

This invention relates generally to materials handling apparatus, and more particularly to a machine for either stacking or unstacking articles such as wooden pallets and the like.

II. Discussion of the Prior Art

Machinery exists for automating the manufacture of wooden pallets on which products are placed when shipping by truck or rail. In this regard, reference is made to my co-pending application Ser. No. 08/695,936, filed Aug. 12, 1996, which describes a machine for facilitating the assembly and nailing of lumber items when fabricating pallets. Machines are also known for taking the finished pallets from a conveyor and thereafter arranging a plurality of such pallets in a vertical stack. Here, reference is made to the Model 505 pallet stacking machine manufactured by applicant's assignee. In this machine, new pallets are added to the stack by elevating an entire stack and inserting the next pallet at the bottom of the stack and then again elevating the stack preparatory to receiving the next pallet to be added.

Stated otherwise, a new pallet to be added to the stack enters below the stack being built and it is raised to the bottom of the stack. Once the height of the stack reaches a predetermined number of pallets, it must be removed from the stacking machine. To accomplish this, it is necessary to include as a part of the machine a set of outfeed rollers for holding the finished stack at a location that is displaced from the stacking machine so that a new stack can be started. The completed stack now on the outfeed rollers now must be removed therefrom and lowered to the floor, requiring a fork truck and an operator.

Not only does inclusion of the outfeed rollers and the need for a forklift and driver necessarily raise the cost of production of pallets but also, because the lifting mechanism employed must be sufficiently robust to lift an entire stack which may easily weight 1200 lbs., the pneumatic or hydraulic system employed necessarily has to be sufficiently large to handle the load, which too adds to the cost.

Another problem that often arises when prior art pallet stacking machines are used occurs if an irregularly shaped pallet enters the stack. If an uneven pallet is added to the bottom of the stack, it can tip the entire stack that is placed on it. This may require the operator to summon a forklift operator to lift the portion of the stack above the irregular pallet so that the irregular one can be removed from the bottom of the stack.

The present invention obviates all of the foregoing problems by providing a pallet stacking machine that enters a new pallet to a stack by adding it to the top thereof rather than lifting the stack and inserting the new pallet below the others. By using this approach, a stack can be built directly on the ground, which allows an inexpensive pallet jack instead of a forklift to move a completed stack of pallets away from the stacking machine so that a new stack can be created.

It should also be apparent that a pallet stacking machine which adds the newest pallet to the top of the stack only requires the lifting of one pallet at a time. Accordingly, the cost of lifting mechanism and the power supply, whether pneumatic or hydraulic, is reduced. These features necessarily reduce the overall cost of pallet production.

SUMMARY OF THE INVENTION

In accordance with the present invention, the machine for stacking articles, one atop another comprises a frame having a generally rectangular base, preferably formed from square tubing. Affixed to the four corners of the base and projecting vertically therefrom are elongated corner posts. Welded or otherwise attached to the upper ends of the corner post is a generally rectangular top frame member also formed from rectangular tubing. Affixed to two adjacent corner posts and extending longitudinally therealong are first and second U-shaped channels that function as guide tracks. Extending horizontally between the two guide tracks is a carriage assembly having rollers on each end thereof for engaging the track.

Means are provided for raising and lowering the carriage assembly within the guide tracks. Specifically, extending between the corner post to which the tracks are affixed and proximate the upper end thereof is an elongated rod or shaft that is journaled for rotation about a horizontal axis. Mounted on the cylindrical shaft are first and second sheaves about which cables are wrapped with a free end of the cables being secured to the carriage member.

Slidably mounted on guide rails comprising the carriage assembly is an article grasping device having first and second parallel, spaced-apart arms extending normally to the guide rails. On each end of the arms are fingers whose motion are controlled by pneumatic cylinders that can be made to move between an article grasping and an article receiving positions.

With the above-described machine, articles, such as a wooden pallets, can be grasped by the fingers, elevated to a predetermined height above the level of the existing stack and transported laterally until the article being repositioned is located vertically above the existing stack, at which point the carriage assembly is lowered until the new pallet rests atop the stack.

DESCRIPTION OF THE DRAWINGS

The foregoing features, objects and advantages of the invention will become apparent to those skilled in the art from the following detailed description of a preferred embodiment, especially when considered with the accompanying drawings in which like numerals in the several views refer to corresponding parts.

DESCRIPTION OF THE PREFERRED EMBODIMENT

Figure 1:
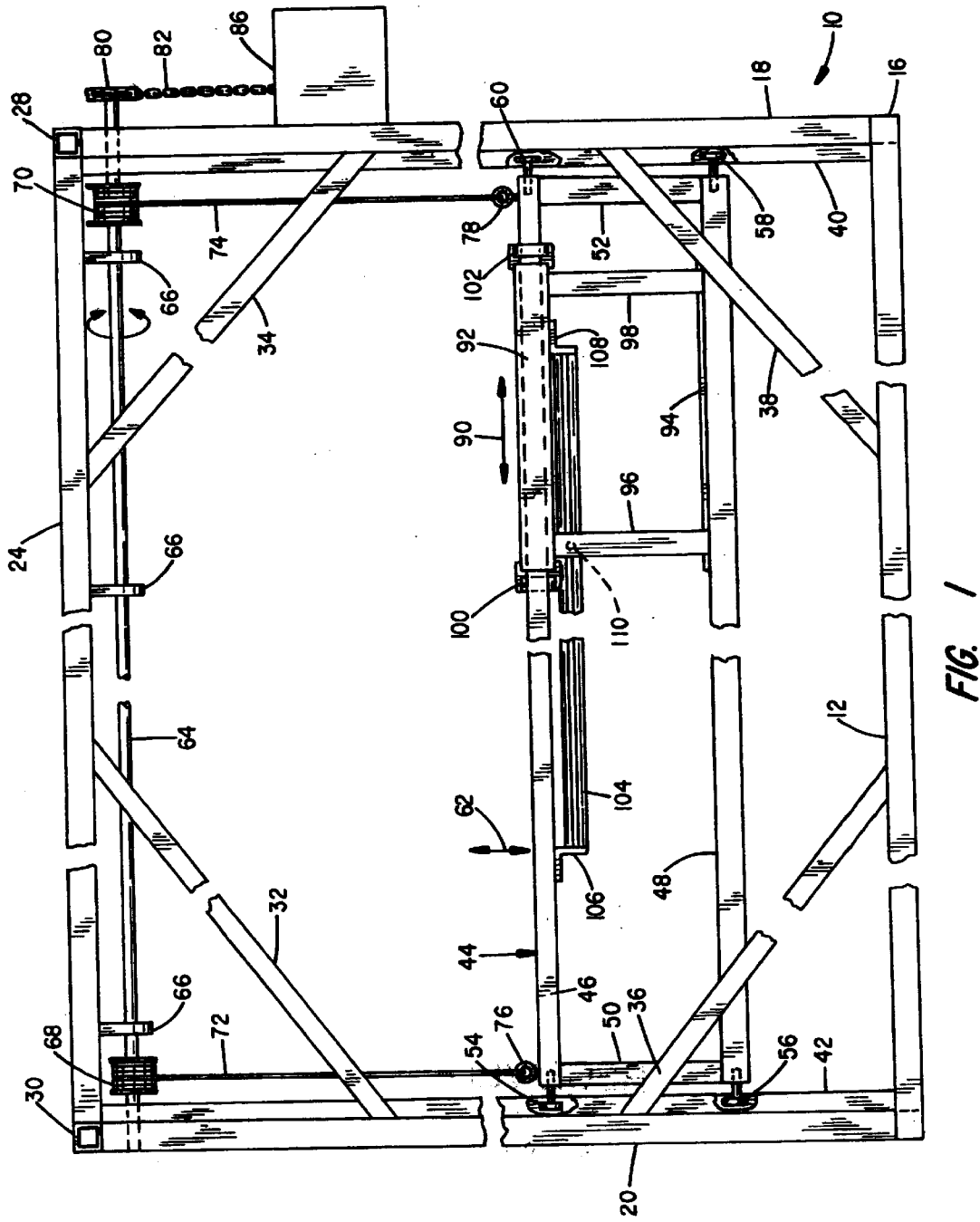
FIG. 1 is a front view of the pallet stacking machine of the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the apparatus and associated parts thereof. This terminology is intended to include the words specifically mentioned above, derivatives thereof and words of similar import.

Figure 2:
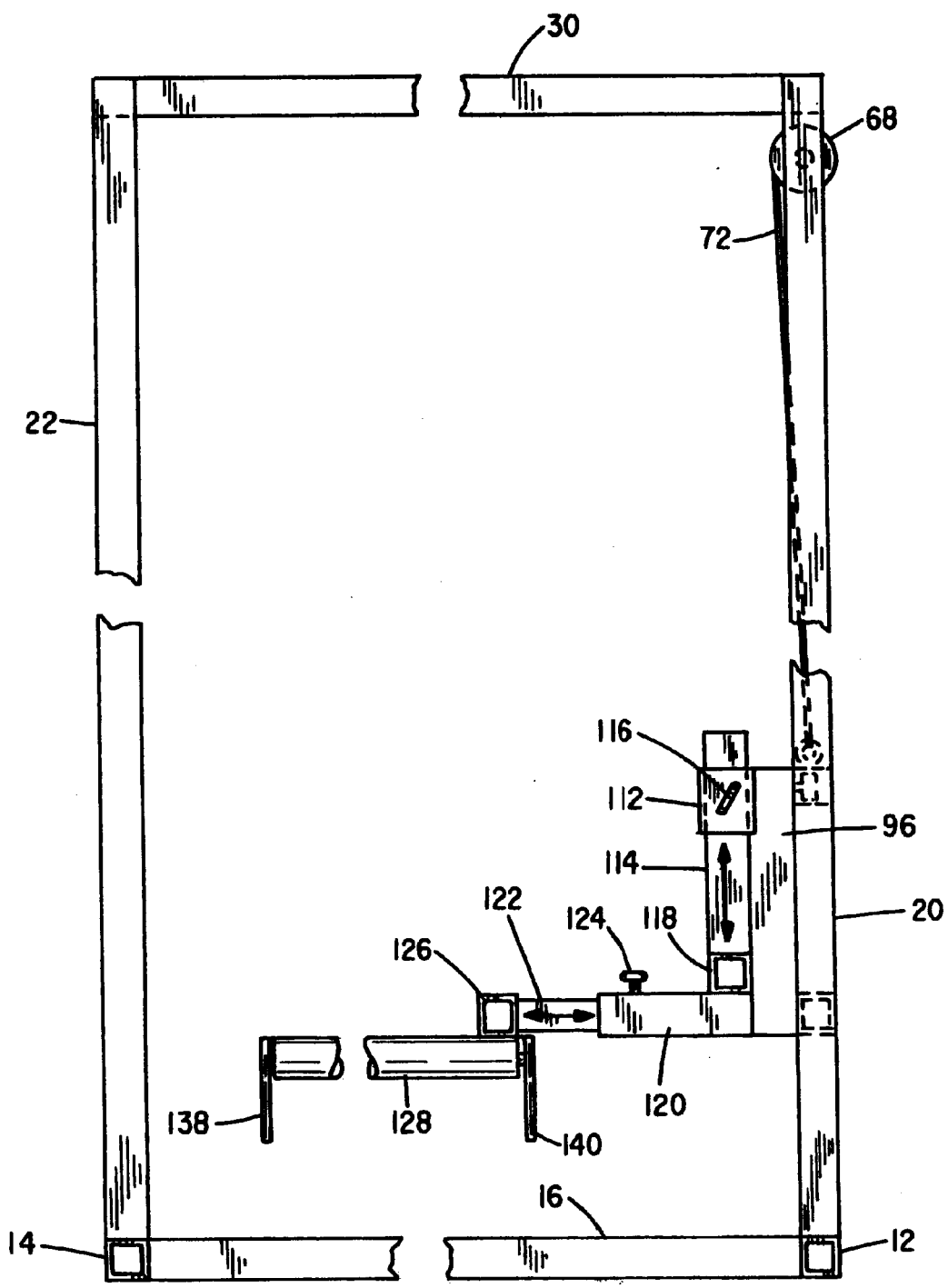
FIG. 2 is a left end view thereof.

Referring to FIGS. 1 and 2, there is indicated generally by numeral 10 a pallet stacking machine constructed in accordance with the present invention. It includes a frame preferably constructed from 2 inch square, steel tubing, the segments of which are welded or otherwise fastened together to create a generally rectangular base that includes a front member 12, a rear member 14 and a right side member 16. The left side of the base does not include a side member so that a wheeled pallet jack can be used to extract a stack of pallets, as much as 20 high, from the stacker 10. Projecting upwardly from the four corners of the base are right front corner post 18, left front corner post 20, a right rear corner post (not shown) and a left rear corner post 22. The corner posts may also comprise steel tubing of a square cross-section.

Extending between front right and front left corner posts 18 and 20 is a top frame member 24 and, likewise, extending between the rear right and rear left corner posts is a tubular frame member 26. Upper right side frame member 28 extends between the right front corner post 18 and the right rear corner post (not shown). Similarly, a square tube frame member 30 extends between the upper ends of the corner posts 20 and 22.

Adding structural rigidity to the frame are gusset members 32, 34, 36 and 38 that extend between the corner post members and the upper and lower front and rear frame members. Again, the gussets may comprise 2 inch rectangular tube members that are welded in place so as to function as reinforcing struts.

Without limitation, the front and rear base members 12 and 14 may be approximately 25 feet in length and the side base member 16 may be about 12 feet long.

Affixed to facing sides of the front corner posts 18 and 20 are U-shaped channel members 40 and 42. As will be explained, the channel members 40 and 42 function as a track for a carriage assembly indicated generally by numeral 44. The carriage assembly comprises upper and lower guide rails 46 and 48 that are maintained in parallel, spaced-apart relationship by left and right spacer tubes 50 and 52, respectively. Again, the upper and lower guide rails 46 and 48, as well as the left and right spacers 50 and 52, may be fabricated from square steel tubing. Attached to the carriage member 44 at opposed ends thereof are upper and lower rollers 54, 56, 58 and 60 designed to ride within the U-shaped channels or tracks 40 and 42. Thus, the carriage assembly 44 is confined to reciprocally move up and down in a vertical direction as indicated by the arrow 62 in FIG. 1.

To effect such vertical displacement, there is provided an elongated steel cylindrical rod 64 that is journaled for rotation in bearing plates, as at 66, that are affixed at spaced locations along the front upper frame member 24. Affixed to the rod and rotatable therewith are a pair of sheaves 68 and 70 on which are wrapped elongated flexible wire cables 72 and 74. The free ends of the cables are affixed to eye-bolts 76 and 78 that are connected to the upper guide rail 46 of the carriage assembly 44. Shown affixed to the right end of the elongated cylindrical shaft 64 is a sprocket wheel 80. Deployed over that sprocket wheel (not shown) is an endless chain 82 which also engages a sprocket wheel on the shaft of a motor contained within a commercial garage door opener module 86 that is affixed to the right side of the frame. Without limitation, a suitable garage door power unit for driving the shaft 64 may comprise a Model J Lift Master™ sold by Link Industries, Inc. of Ronkonkoma, N.Y. Actuation of the motor control mechanism 86 will result in the raising or lowering of the carriage assembly 44 as the cable is either wound or unwound from the sheaves 68 and 70.

Figure 3:
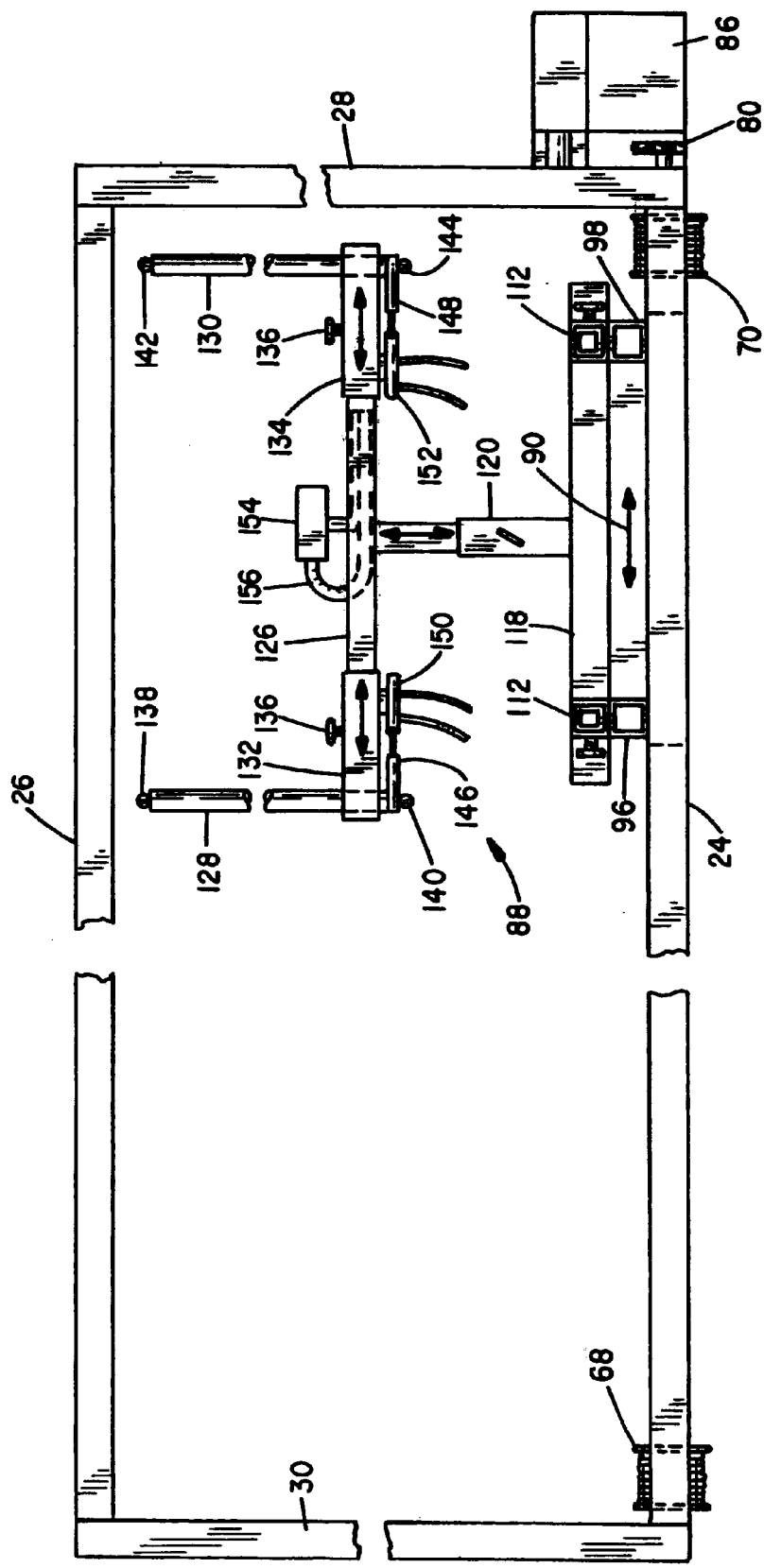
FIG. 3 is a top view thereof.

A pallet grasping mechanism, indicated generally by numeral 88 in FIG. 3, is affixed to and slidable along the upper and lower guide rails 46 and 48 of the carriage assembly as indicated by the double-headed arrow 90 in FIGS. 1 and 3.

The grasping assembly 88 comprises upper and lower angle bars 92 and 94 that are maintained in parallel, spaced-apart relation by spacer members 96 and 98. The upper angle bar 92 partially surrounds the upper guide rail 46 on the front and top surfaces thereof and cam rollers, as at 100 and 102, prevent the angle bar 92 from disengaging from the upper guide rail 46. The angle bar 94 overlays the top and rear surface of the lower guide rail 48. While not shown in the drawings, a suitable bearing materials, such as a layer of nylon plastic is disposed between the angle bars 92 and 94 and the rails 46 and 48 on which they ride to permit relatively smooth, low-friction travel of the grasping mechanism 88 along the upper and lower guide rods 46 and 48.

Motive power for translating the grasping mechanism 88 along the upper and lower guide rails of the carriage assembly may be provided by an elongated rodless air cylinder assembly 104 which is affixed between brackets 106 and 108 that are attached to the undersurface of the upper guide rail 46. The rodless air cylinder is commercially available from Parker Motion and Control Company of Akron, Ohio. The rodless air cylinder 104 has its moveable actuator 110 affixed to the spacer 96 so that as it traverses the length of the cylinder 104, it carries the article grasping assembly 88 along with it.

As can be observed in FIG. 2, welded to the spacer struts 96 and 98 near the upper end thereof are tubular collars, as at 112, into which are fitted stub shafts 114. Thumb screws 116 passing through the tubular collars 112 permits the stub shafts 114 to be set at a desired elevation when initially the article stacker.

Affixed to the lower end of the stub shafts is a cross bar 118 and welded to its underside at its approximate midpoint is a rearwardly extending tubular collar 120. Sliding telescopingly within the collar 120 is a stub shaft 122 and a thumbscrew 124 can again be used to adjust the positioning of the stub shaft 22 for initially positioning components of the grasping mechanism at the time of installation.

Welded to the outward end of the stub shaft 122 is a cross arm 126 and suspended from the cross arm at opposed ends thereof are rotatable rods 128 and 130. More particularly, and as is best seen in the top view of FIG. 3, sliding over the opposed ends of the cross arm 126 are sleeves 132 and 134, which allow for an adjustable spacing between the rotatable rods 128 and 130 to accommodate the dimensions of the article, e.g., pallet, to be grasped. Again, thumb screws or an equivalent arrangement, as at 136, can be used to adjust the distance between rods 128 and 130. Affixed to the opposed ends of the rods 128 and 130, and projecting downwardly therefrom when viewed in FIG. 3, are fingers 138, 140, 142 and 144. The rods 128 and 130 are rotatably mounted relative to the sleeves 132 and 134 and bell cranks 146 and 148 are secured to each of the rods and to a piston of air cylinders 150 and 152. Hydraulics may be used as well. Thus, actuation of the air cylinders 150 and 152 will rotate the rods 128 and 130 to reorient the fingers 138, 140, 142 and 144 from a generally vertical disposition to a generally horizontal disposition.

An air switch 154 controls the operation of the pneumatic cylinders 150 and 152. The air switch has a compressible pressure sensing tube 156 that is routed beneath the cross arm 126. As that arm assembly is lowered onto a pallet or other article to be stacked, the pressure within the compressible tube 156 changes and sends a signal, via the air switch 154, to cause the air cylinders 150 and 152 to rotate the arms 128 and 130 such that the fingers 138, 140, 142 and 144 flip into engagement with the pallet or other article to be stacked.

OPERATION

Figure 4:
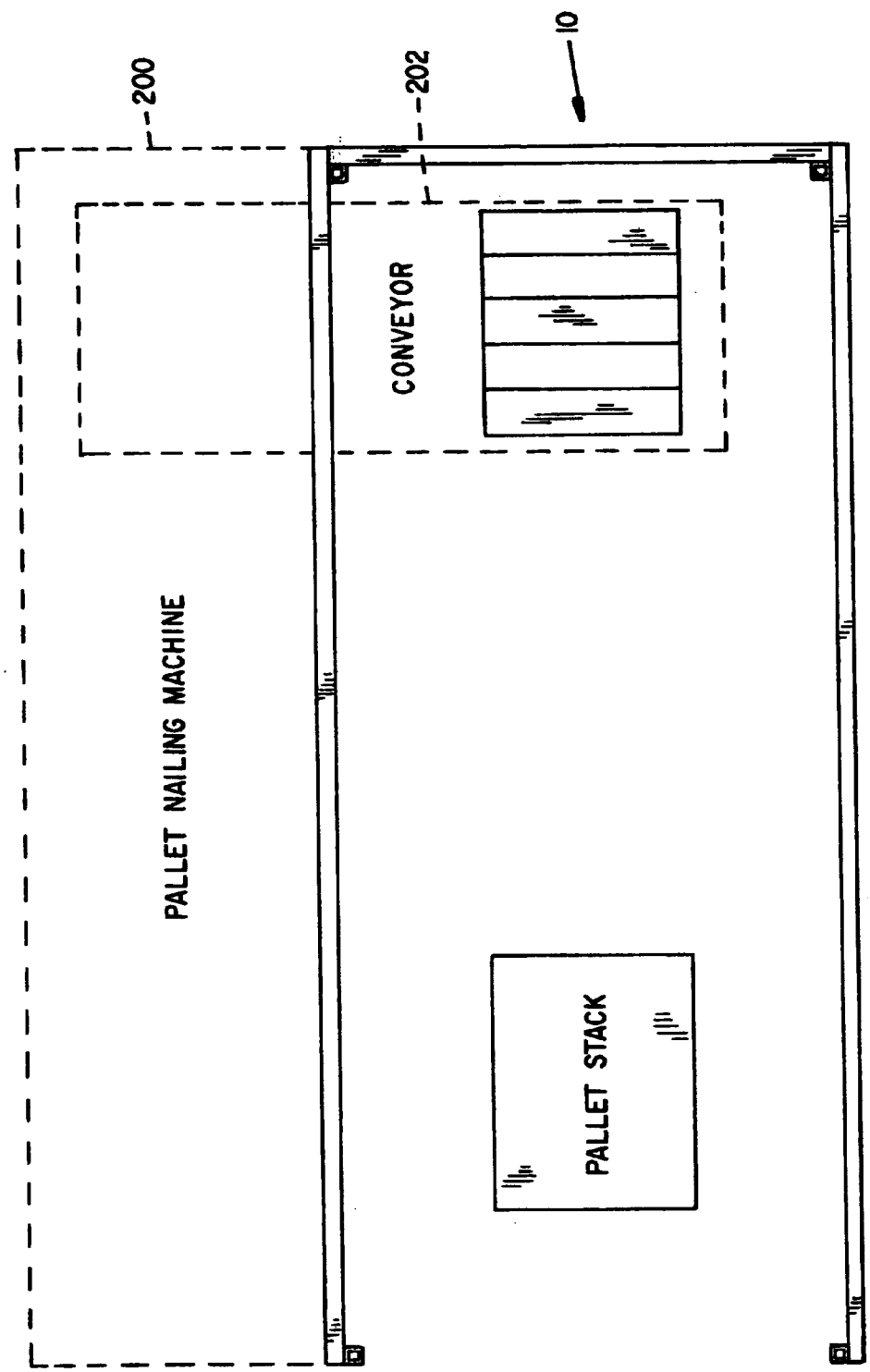
FIG. 4 is a schematic drawing of the article stacking machine at a work site.

Referring to FIG. 4 which shows a plan view of a work location where the stacker 10 of the present invention is used, it will be seen that the stacker 10 of FIGS. 1–3 may be positioned adjacent to a pallet nailing machine, represented by a broken line box 200. Following completion of the nailing operation, assembled pallets are dropped onto a conveyor 202 and transported to a home position just above the floor on which the stacker 10 rests. It is the function of the stacking machine of the present invention to take a finished pallet from the conveyor 202 at the home position and deposit it on the top of a stack of finished pallets.

An electric eye senses the presence of a pallet at the home position. When the stacking machine of FIGS. 1–3 is cycled, the carriage assembly 44 may be lowered as the motor and controller mechanism 86 drives the shaft 64, via the chain 82 and sprocket 80, to play out cable from the sheaves 68 and 70. At the same time, the linear rodless air cylinder 104 is actuated to slide the pallet grasping means 88 so as to vertically overlay the new pallet on the conveyor. As the carriage assembly is lowered onto the pallet to be moved, the pressure sensor 156 will come into engagement with the top surface of that pallet. The resulting pressure change will actuate the air switch 154 to, in turn, cause the air cylinders 150 and 152 to be actuated. This rotates the rods 128 and 130 so that the fingers on the ends thereof will move to a horizontal, inwardly directed disposition beneath the top layer of boards on the pallet to be stacked. At this point, the controller 86 causes the associated motor to drive the shaft 64 in a direction to wind up the cables 72 and 74 onto their respective sheaves 68 and 70 and thereby lift the new pallet from the conveyor. A sensor (not shown) mounted on the pallet grasping mechanism senses the top of the stack and stops the lift motor when the carriage is above the level of the stack. Simultaneously, the rodless air cylinder will cause the pallet to be shifted laterally toward the pallet stack. When the pallet being carried is vertically aligned with the top pallet on the stack as determined by either transit time or a limit switch, the motor and controller 86 is again actuated to effect a lowering of the carriage assembly 44 until the sensor tube 156 again comes into contact with the upper surface of the pallet that at the moment is suspended from the fingers on the arms 128 and 130. This only happens when the pallet being transported comes to rest on the top of the stack as the carriage continues downward. Actuation of the air switch 154 now causes the air cylinders 150 and 152 to rotate the arms 128 and 130 so that the fingers affixed to them disengage from the undersurface of the top boards on the pallet. Now, when the carriage is again elevated relative to the stack, the pallet that had been carried to the stack is left in place on the top of the stack as the carriage and pallet grasping mechanisms move back to the home position above the conveyor 202 in anticipation of picking up another new pallet to be stacked.

It will be apparent to those skilled in the art that the present invention may also find use in unstacking articles (pallets) from a stack and feeling them one at a time to a pallet loading conveyor.

ALTERNATIVE EMBODIMENT

Figure 5:
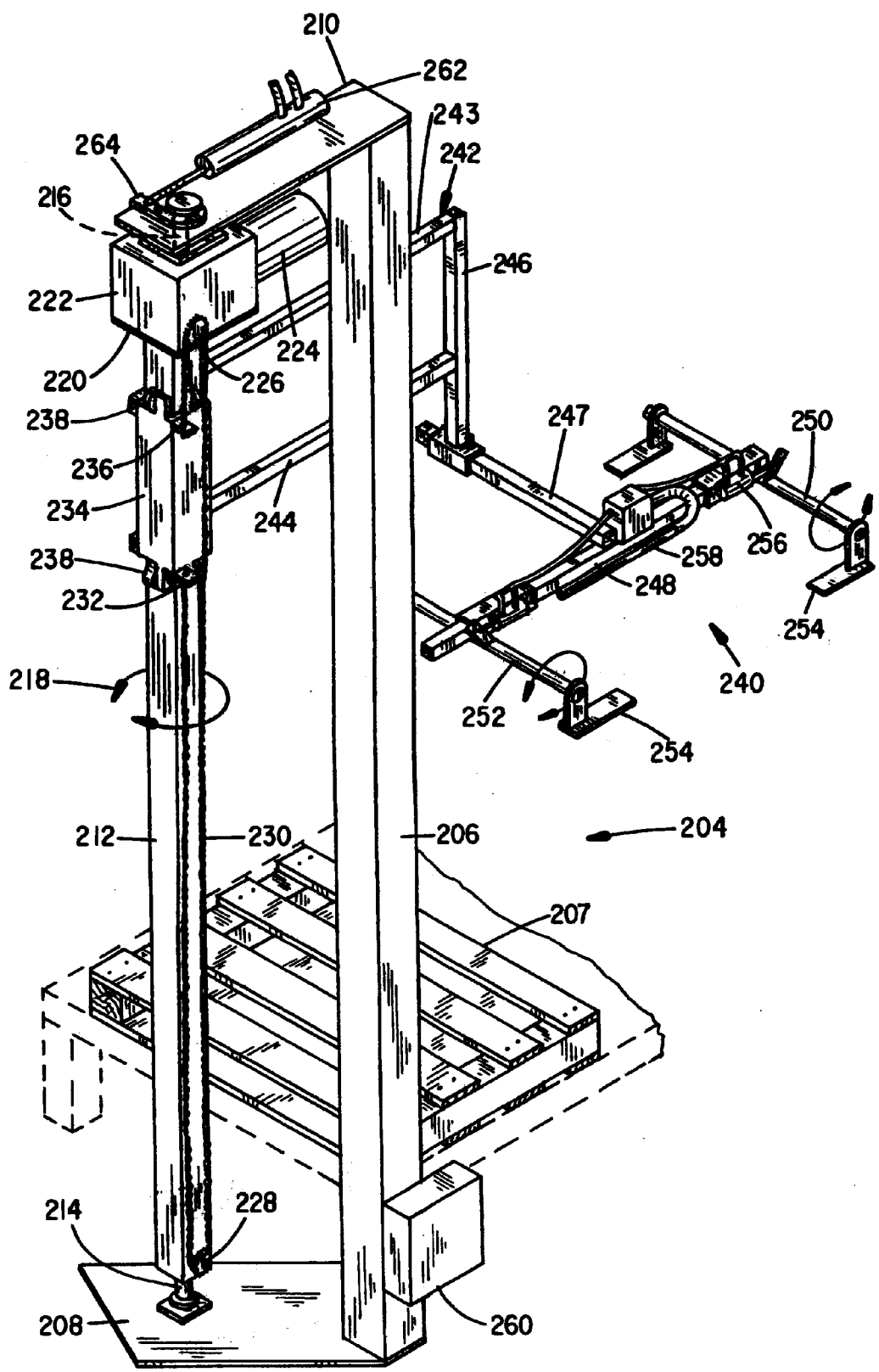
FIG. 5 is a perspective view of an alternative embodiment of a pallet stacking machine in accordance with the present invention.

FIG. 5 shows an alternative embodiment of the present invention and it is indicated generally by numeral 204. Also shown in FIG. 5 is a finished pallet 206 resting on the bed of a pallet nailing machine that is shown in phantom line. The pallet stacking machine 204 is designed to pick up a finished pallet from the bed of the pallet nailing machine and transport it to the top of a stack of such finished pallets.

The pallet stacking machine 204 is seen to comprise a stationary support post 206 which extends upwardly from a floor mounted plate 208 located at one corner of the nailing machine and which may serve as one leg of the pallet nailing machine. The post 206 preferably comprises 4" steel tubing of a generally rectangular cross section and may be approximately 11 feet in height. Welded to the upper end of the stationary support post 206 is a bearing mounting plate 208 that extends laterally outward from the stationary post.

Extending parallel to the stationary post 206 between the mounting plate 208 and the bearing plate 210 is a rotatable post 212. More specifically, affixed to the floor plate 208 is a first pivot and bearing assembly 214. A second such bearing assembly 216 is supported by the bearing mounting plate 210 and the post 212 may, therefore, rotate about a vertical axis as indicated by the double-headed arrow 218. Welded or otherwise attached to the upper end of the rotatable post 212 is a mounting plate 220 which supports thereon a gear reduction transmission 222 and an electric motor 224 that is coupled to the input shaft (not shown) of the transmission module 222.

The output shaft of the transmission module 222 has a chain sprocket wheel 226 affixed to it. Also, journaled for rotation near the lower end of the post 212 is an idler sprocket wheel 228. A chain 230 is attached at one end 232 to a collar 234 that freely surrounds the rotatable post 212 passes around the idler sprocket wheel 228 and then extends vertically so as to be deployed about the drive sprocket wheel 226. The second end of the chain 230 is attached at 236 to the upper end of the collar 234.

To facilitate sliding movement between the post 212 and the collar 234, a plurality of rollers as at 238 are journaled for rotation at opposite ends of each of the four sides of the collar 234 with those rollers cooperating with the respective side surfaces of the post 212. Depending upon the direction of rotation of the motor 234, the collar 234 may be made to ride up and down the length of the rotatable post 212.

Welded to and projecting outwardly from one side surface of the collar 234 is a means for grasping a finished pallet, such as pallet 206, when residing on the bed of the pallet making machine. The grasping mechanism is indicated generally by numeral 240 and includes an arm structure 242, including a pair of parallel arms 243 and 244 that are welded at one end to the collar 234 and which are held in parallel, spaced relation by a transversely extending bar 246 welded to the opposite ends of the arm members 243 and 244.

Attached to the lower end of the bar 246 is a transverse support member 248. Attached at opposite ends of the support member 248 are first and second pivotable rods 250 and 252 where each of the rods has a pair of finger members as at 254 affixed thereto. The fingers are generally L-shaped and are designed to rotate with the pivot rods 250 and 252 from a pallet engaging disposition to a pallet releasing disposition. The means for pivoting the pivotable rods from the pallet engaging position to the pallet disengaging position preferably comprise air cylinders as at 256 operating a bell crank affixed to the pivotable rods. Fastened to the underside of the transverse support member 248 is a pressure sensitive air switch 258 that is connected in a pneumatic circuit with the air cylinders 256 as well as to a motor control circuit (not shown) contained within the electrical housing 260 mounted to the base of the stationary post 206.

Affixed to the bearing mounting plate 210 at the top of the stationary post 206 is a further hydraulic or air cylinder 262 whose piston rod is connected to a lever arm 264 for imparting torque to the rotatable post 212 through the bearing 216 and the gear box 222.

In operation, after completing its nailing cycle, the pallet nailing machine leaves the finished pallets 207 on its bed adjacent the stationary post 206. An operator depresses a push button, sending a control signal to the motor controller module 260 which causes the motor 224 to be energized. The motor drives the sprocket 226, via transmission 222, to pull the collar 224 downward from its illustrated home position until the pressure actuated pneumatic switch 258 on the undersurface of the transverse support member 248 abuts the pallet 207. Actuation of the pressure switch through this contact causes the air cylinders 256 to pivot the rods 250 and 252 so that the attached fingers 254 sweep under the boards on each end of the finished pallet 207. The pressure switch actuation also initiates a reversal of the direction of rotation of the motor 224. The collar 234 carrying the pallet grasping mechanism 240 and a pallet then rises up the rotatable post 212 with rollers 238 riding along the mutually perpendicular side walls comprising the rectangular post 212. When the collar 234 carrying the pallet grasping mechanism 240 and one of the finished pallets reaches a predetermined height as determined by an appropriate limit switch (not shown), the motor 224 turns off and the cylinder 262 is actuated to rotate the post 212 about its pivot bearings 214 and 216. This swings the pallet and pallet grasping mechanism through an arc so that it is no longer disposed over the bed of the nailing machine, but instead, is posed vertically above a point on the ground where a stack of pallets is being formed. Once the rotational movement has taken place, the motor 224 is again actuated in a direction to cause the chain to lower the collar and pallet along the post 212.

When the bottom of the pallet being carried touches either the ground (in the case of the first pallet in the stack) or engages the upper surface of a previously placed pallet, the pressure switch 258 is again actuated to momentarily stop the motor 224 and to pivot the rotatable rods 250 and 252 so that the fingers 254 swing to the point where they no longer engage the boards on opposite sides of the pallet. The motor 244 then restarts, causing the pallet grasping mechanism and collar to again move upward to a predetermined height determined by the limit switch (not shown) whereat the motor 224 again stops and the cylinder 262 is again actuated to swing the pallet grasping mechanism back in the opposite direction to its original home position, i.e., the one illustrated in FIG. 5. When the pallet nailing machine deposits another finished pallet 206 at the end of its bed, the above-described cycle can again be repeated to pick up the pallet from the bed, elevate it to a predetermined height, swing it through a predetermined arc and then lower it onto the stack of pallets being created, all as previously described.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A machine for removing finished pallets from a pallet nailing machine and placing the finished pallets in stacked relation, comprising:
   (a) means for grasping a finished pallet at said pallet nailing machine;
   (b) means for raising the grasping means holding the finished pallet to a predetermined height, said means for raising the grasping means including
      (i) an elongated vertical post having a first end affixed to the ground and a second end a predetermined distance above the around that is greater than said predetermined height,
      (ii) a collar surrounding the vertical post adapted to ride along an exterior surface of said post with an arm supporting said grasping means affixed at one end to the collar and projecting generally perpendicular to the post,
      (iii) a motor supported by the post proximate the second end for driving a first sprocket wheel,
      (iv) a second sprocket wheel journaled for rotation on said post proximate said first end, and
      (v) an endless chain deployed about the first and second sprocket wheels and secured to the collar for raising and lowering the collar along the post;
   (c) means for transporting the grasping means at said predetermined height to a position above a location where a stack is being formed;
   (d) means for lowering the grasping means until the finished pallet in the grasping means is atop the stack; and
   (e) means responsive to the finished pallet reaching the top of the stack for releasing the grasping means.

2. The machine as in claim 1 wherein the means for transporting the grasping means includes:
   (a) means for journaling the post for rotation about a vertical axis; and
   (b) means proximate the second end for applying a torque to the post.

3. The machine as in claim 1 wherein the grasping means includes:
   (a) a transverse support member affixed to said arm, the transverse support member being of a length about equal to a length or width dimension of said pallets;
   (b) first and second pivotable rods respectively located at opposite ends of the transverse support member and having first and second finger member projecting normally to each of the pivotable rods; and
   (c) means for pivoting the pivotable rods from a first position where said first and second finger members engage the pallet to a second position disengaged from the pallet.

4. A machine for stacking articles, comprising:
   (a) a frame comprising a generally rectangular frame base with vertically extending corner posts of a predetermined length joined at upper ends thereof by a generally rectangular frame top;
   (b) first and second track members affixed to and longitudinally aligned with two adjacent ones of the corner posts, respectively;
   (c) a carriage assembly mounted between said first and second track members;
   (d) drive means coupled to said carriage assembly for reciprocally, vertically displacing the carriage assembly along said first and second track members;
   (e) article grasping means movably mounted on the carriage assembly for selectively engaging and disengaging with respect to an article to be stacked; and
   (f) means for transporting the article grasping means in a horizontal direction along the carriage assembly.

5. The machine of claim 4 wherein the drive means comprises:
   (a) an elongated rod journaled for rotation between said two adjacent ones of the corner posts;
   (b) a first sheave affixed to the rod;
   (c) an elongated cable wound on said first sheave and affixed to the carriage; and
   (d) means for rotating the elongated rod.

6. The machine of claim 5 and further including a second sheave affixed to the rod and spaced from the first sheave; and a second elongated cable wound on said second sheave and connected to the carriage.

7. The machine as in claim 4 wherein the carriage assembly comprises first and second horizontal guide rails held in parallel, spaced-apart relation by first and second vertical bar members, said first and second horizontal guide rails including roller means at opposed ends thereof for engaging the first and second track members.

8. The machine of claim 7 wherein the article grasping means comprises:
   (a) a slide member mounted on the first horizontal guide rail;
   (b) an arm affixed to the slide member and projecting perpendicular to a plane defined by the two adjacent ones of the corner post, said arm including the means for selectively engaging and disengaging the article; and
   (c) means for translating the slide member along the first guide rail.

9. The machine of claim 8 wherein the means for translating the slide member is an elongated, air-operated, rodless air cylinder operatively coupled between the slide member and the first horizontal guide rail.

10. The machine as in claim 8 wherein the means for selectively engaging and disengaging the article comprises first and second fingers pivotally affixed to the arm and air cylinder means operatively coupled to pivot the first and second fingers.

11. The machine as in claim 5 and further including:
    (a) a motor having an output shaft coupled to a sprocket on the elongated rod; and
    (b) motor control means for controlling an on/off state of the motor.

12. A pallet stacking machine comprising in combination:
    (a) a frame including
       (i) a generally rectangular base defining four corners,
       (ii) a vertically oriented elongated post at each of the four corners, and
       (iii) a plurality of top frame members extending between adjacent ones of the vertically oriented posts;
    (b) a pallet elevator mounted on the frame for engaging and lifting a pallet in a vertical direction, the pallet elevator having
       (i) a pair of elongated, horizontally disposed guide rails held in parallel, spaced-apart relation by vertical spacers located proximate opposed ends of the guide rails,
       (ii) roller means affixed to the opposed ends of the pair of guide rails, the rollers traveling in the guide tracks,
       (iii) a motor driven rotatable shaft journaled for rotation between the first and second adjacent ones of the vertically oriented posts,
       (iv) a sheave secured to the rotatable shaft, and
       (v) a cable wrapped about the sheave with a free end secured to one of the pair of guide rails;
    (c guide tracks affixed to first and second adjacent ones of the vertically oriented elongated posts for guiding said pallet elevator; and
    (d) means disposed on the pallet elevator for laterally translating a pallet in a horizontal direction from a pallet pick-up station to a pallet release station whereby a pallet can be carried from the pick-up station and placed atop a stack of pallets at the pallet release station.

13. The machine of claim 12 wherein the means disposed on the pallet elevator for laterally translating a pallet comprises:
    (a) means for grasping a pallet supported on the pair of guide rails; and
    (b) drive means coupled between the grasping means and one of the pair of guide rails for imparting lateral motion to the grasping means relative to the one of the pair of guide rails.

14. The machine of claim 13 wherein the means for grasping a pallet includes:
    (a) a slide member mounted on the one of the pair of guide rails;
    (b) first and second rotatable rods affixed to opposed ends of a cross arm, said cross arm being connected to the slide member;
    (c) a finger member attached to opposed ends of the first and second rotatable rods; and
    (d) pneumatic cylinder means coupled between the cross arm and the rotatable rods.

* * * * *